United States Patent
Na et al.

(10) Patent No.: US 11,488,013 B2
(45) Date of Patent: Nov. 1, 2022

(54) MODEL TRAINING METHOD AND APPARATUS

(71) Applicant: Samsung Electronics Co., Ltd., Suwon-si (KR)

(72) Inventors: Hwidong Na, Seongnam-si (KR); Hyohyeong Kang, Hwaseong-si (KR); Hogyeong Kim, Daejeon (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 16/562,783

(22) Filed: Sep. 6, 2019

(65) Prior Publication Data

US 2020/0356852 A1 Nov. 12, 2020

(30) Foreign Application Priority Data

May 7, 2019 (KR) .................. 10-2019-0053131

(51) Int. Cl.
G06N 3/08 (2006.01)
(52) U.S. Cl.
CPC ...................... G06N 3/08 (2013.01)
(58) Field of Classification Search
CPC ...................................................... G06N 3/08
See application file for complete search history.

(56) References Cited

U.S. PATENT DOCUMENTS

| | | | | |
|---|---|---|---|---|
| 9,799,327 | B1* | 10/2017 | Chan | G06F 40/12 |
| 11,017,778 | B1* | 5/2021 | Thomson | H04M 3/42382 |
| 11,244,671 | B2* | 2/2022 | Kim | G06N 3/08 |
| 2018/0268292 | A1* | 9/2018 | Choi | G06K 9/6264 |
| 2018/0330737 | A1 | 11/2018 | Paulik et al. | |
| 2019/0034764 | A1* | 1/2019 | Oh | G06V 20/00 |
| 2019/0050715 | A1* | 2/2019 | Ooi | G06K 9/6262 |
| 2020/0175961 | A1* | 6/2020 | Thomson | G10L 15/28 |
| 2021/0182489 | A1* | 6/2021 | Barkan | G06N 3/0454 |
| 2021/0182660 | A1* | 6/2021 | Amirguliyev | G06N 3/0454 |
| 2021/0397954 | A1* | 12/2021 | Yoshihama | G06N 3/08 |
| 2022/0172737 | A1* | 6/2022 | Wang | G10L 21/0308 |

OTHER PUBLICATIONS

Kim, Yoon, et al., "Sequence-Level Knowledge Distillation", *arXiv preprint arXiv:1606.07947* Sep. 22, 2016 (pp. 1-11).
Ravi, Sujith., "ProjectionNet: Learning efficient on-Device Deep Networks Using Neural Projections", *arXiv preprint arXiv:1708.00630*, Aug. 9, 2017, (pp. 1-12).
Yu, Dong et al., "Recent Progresses in Deep Learning based Acoustic Models", *IEEE/CAA Journal of Automatica Sinica*, vol. 4, Issue 3, 2017 (pp. 1-13).

(Continued)

*Primary Examiner* — Viral S Lakhia
(74) *Attorney, Agent, or Firm* — NSIP Law (57) ABSTRACT

A model training method and apparatus is disclosed, where the model training method acquires a recognition result of a teacher model and a recognition result of a student model for an input sequence and trains the student model such that the recognition result of the teacher model and the recognition result of the student model are not distinguished from each other.

16 Claims, 8 Drawing Sheets

(56) References Cited

OTHER PUBLICATIONS

Senellart, Jean, et al. "OpenNMT System Description for WNMT 2018: 800 words/sec on a single-core CPU." *Proceedings of the 2nd Workshop on Neural Machine Translation and Generation*, 2018 (pp. 122-128).
Wang, Xiaojie, et al. "KDGAN: Knowledge Distillation with Generative Adversarial Networks", *Advances in Neural Information Processing Systems*, 2018 (pp. 1-12).
Xu, Zheng et al., "Training Shallow and Thin Networks for Acceleration via Knowledge Distillation with Conditional Adversarial Networks", *arXiv preprint arXiv:1709.00513*, Jan. 2017 (pp. 1-10).
Camino, Ramiro D. et al., "Generating Multi-Categorical Samples with Generative Adversarial Networks", *arXiv preprint arXiv:1807.01202*, Jul. 4, 2018 (7 pages in English).
Liu, Peiye, et al., "Ktan: Knowledge Transfer Adversarial Network", *arXiv preprint arXiv:1810.08126*, Oct. 18, 2018 (8 pages in English).
Extended European Search Report dated Jun. 18, 2020 in counterpart European Application No. 19210350.5 (7 pages in English).

\* cited by examiner

MODEL TRAINING METHOD AND APPARATUS

CROSS-REFERENCE TO RELATED APPLICATIONS

This application claims the benefit under 35 USC § 119(a) of Korean Patent Application No. 10-2019-0053131 filed on May 7, 2019 in the Korean Intellectual Property Office, the entire disclosure of which is incorporated herein by reference for all purposes.

BACKGROUND

1. Field

The following description relates to a model training method and apparatus.

2. Description of Related Art

Research is being actively conducted to classify input patterns in groups so that efficient pattern recognition may be performed on computers. This includes research on an artificial neural network (ANN) that is obtained by modeling pattern recognition characteristics using mathematical expressions through a processor-implemented neural network model, as a specialized computational architecture, which after substantial training may provide computationally intuitive mappings between input patterns and output patterns. The ANN generates mapping between input patterns and output patterns using an algorithm, and a capability of generating the mapping is expressed as a learning capability of the ANN. The ANN may employ an algorithm that mimics abilities to learn. Also, the ANN has a capability to generate a relatively correct output with respect to an input pattern that has not been used for training based on a result of previous training. However, because such operations or applications are performed through specialized computation architecture, and in different automated manners than they would have been performed in non-computer implemented or non-automated approaches, they also invite problems or drawbacks that only occur because of the automated and specialized computational architecture on which they are implement.

Further, studies are being conducted to maximize the recognition rate of the ANN while miniaturizing the size of the ANN.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of training a model, the method including acquiring a recognition result of a teacher model and a recognition result of a student model for an input sequence, and training the student model such that the recognition result of the teacher model and the recognition result of the student model are not distinguished from each other.

The training of the student model may include determining an adversarial loss based on a degree to which the recognition result of the teacher model and the recognition result of the student model are distinguished from each other, and training the student model to reduce the adversarial loss.

The determining of the adversarial loss may include determining the adversarial loss based on a degree to which an output sequence of the teacher model and an output sequence of the student model that are respectively output as recognition results for the input sequence are distinguished from each other.

The determining of the adversarial loss may include determining the adversarial loss by applying a Gumbel-max based on probabilities of elements included in an output sequence.

The determining of the adversarial loss may include determining the adversarial loss by applying a Gumbel-max based on a probability of an output sequence.

The determining of the adversarial loss may include determining the adversarial loss by further applying a Gumbel-max based on probabilities of a number of candidate sequences that are likely to correspond to the output sequence.

The determining of the adversarial loss may include determining the adversarial loss based on a degree to which an element in an output sequence of the teacher model and an element in an output sequence of the student model that are respectively output as recognition results for the input sequence are distinguished from each other.

The determining of the adversarial loss may include determining the adversarial loss by applying a Gumbel-max based on a probability of an element included in an output sequence.

The training of the student model may include training the student model such that the recognition result of the teacher model and the recognition result of the student model are not distinguished from each other by a discriminator model, and the discriminator model may be trained to distinguish between the recognition result of the teacher model and the recognition result of the student model.

The training of the student model may include training the student model using the recognition result of the teacher model such that the recognition result of the teacher model may be output from the student model.

The input sequence may include sentence data including words and speech data including frames.

In another general aspect, there is provided an apparatus for training a model, the apparatus including a processor configured to acquire a recognition result of a teacher model and a recognition result of a student model for an input sequence and to train the student model such that the recognition result of the teacher model and the recognition result of the student model are not distinguished from each other.

The processor may be configured to determine an adversarial loss based on a degree to which the recognition result of the teacher model and the recognition result of the student model are distinguished from each other, and to train the student model to reduce the adversarial loss.

The processor may be configured to determine the adversarial loss based on a degree to which an output sequence of the teacher model and an output sequence of the student model that are respectively output as recognition results for the input sequence are distinguished from each other.

The processor may be configured to determine the adversarial loss by applying Gumbel-max based on probabilities of elements included in an output sequence.

The processor may be configured to determine the adversarial loss by applying Gumbel-max based on a probability of an output sequence.

The processor may be configured to determine the adversarial loss based on a degree to which an element in an output sequence of the teacher model and an element in an output sequence of the student model that are respectively output as recognition results for the input sequence are distinguished from each other.

The processor may be configured to train the student model such that the recognition result of the teacher model and the recognition result of the student model are not distinguished from each other by a discriminator model, and the discriminator model may be trained to distinguish between the recognition result of the teacher model and the recognition result of the student model.

The processor may be configured to train the student model using the recognition result of the teacher model such that the recognition result of the teacher model may be output from the student model.

The apparatus may include a memory configured to store a parameter of the student model, and to store instructions that, when executed, configures the processor to acquire the recognition result of the teacher model and the student model, and to train the student model.

In another general aspect, there is provided an apparatus for training a model, the apparatus including a processor configured to acquire a recognition result of a teacher model and a recognition result of a student model for an input sequence, and train the student model to minimize a distinction between recognition result of the teacher model and the recognition result of the student model, at the discriminator model.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Figure 1:
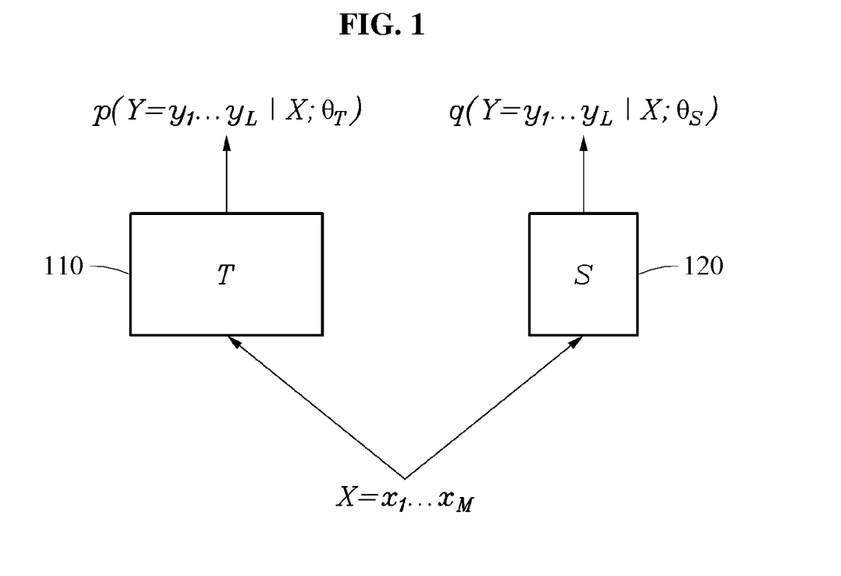
FIGS. 1 and 2 illustrate examples of a teacher model and a student model.
Figure 2:
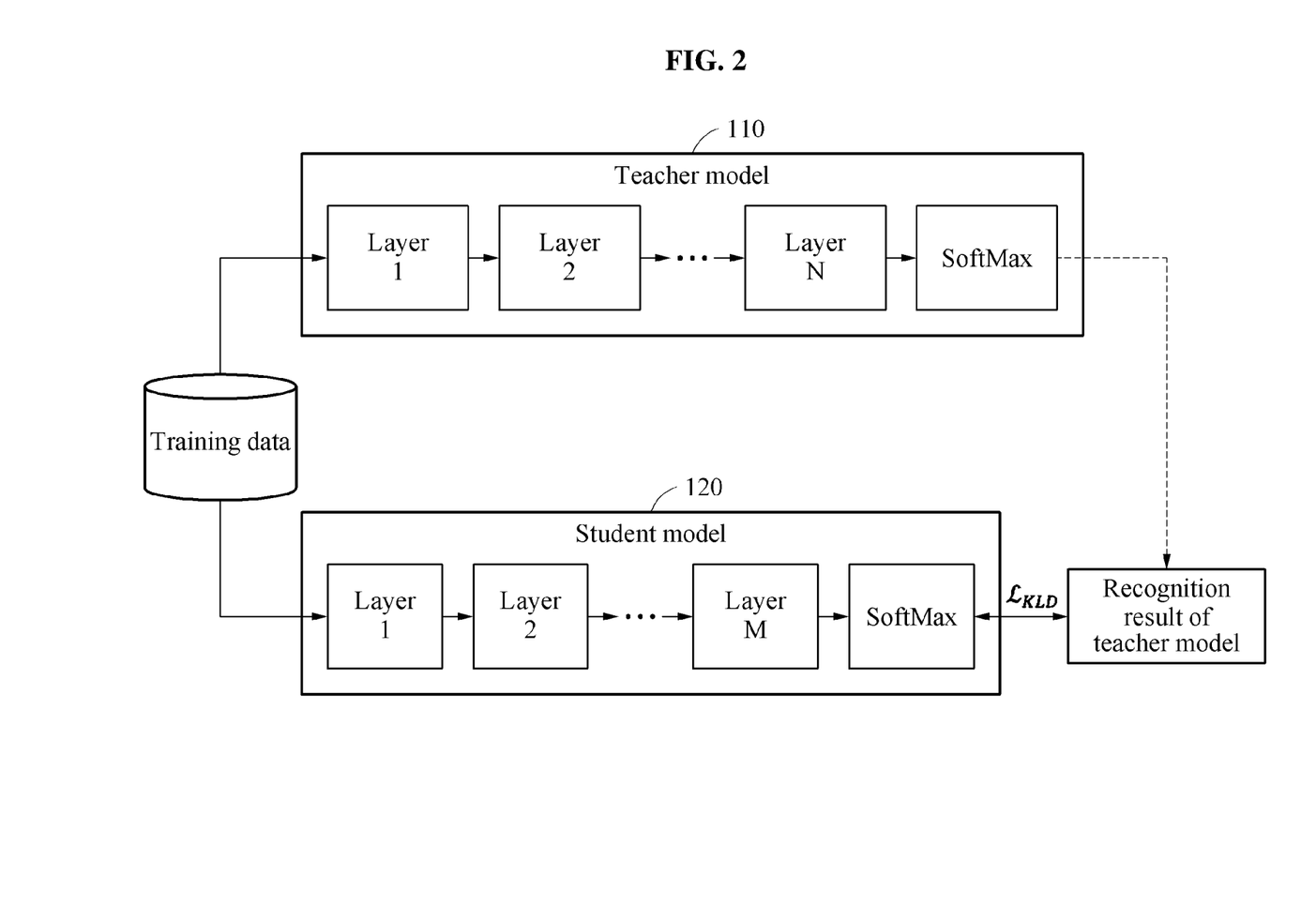

FIGS. 1 and 2 illustrate examples of a teacher model and a student model.

FIG. 1 illustrates a teacher model 110 and a student model 120.

The teacher model 110 and the student model 120 are neural networks having difference sizes and the same target data to be recognized. The neural network is a recognition model using numerous artificial neurons connected through edges.

The teacher model 110 is a model that recognizes target data to be recognized, with a high accuracy using sufficiently numerous characteristics extracted from the target data. The teacher model 110 is greater in size than the student model 120. For example, the teacher model 110 may include more layers, more nodes, or combinations thereof when compared to the student model 120.

The student model 120 is a neural network having a size that is smaller than that of the teacher model 110. Due to the small size, the student model 120 uses lesser memory and has a faster recognition speed than the teacher model 110. The student model 120 is trained such that the same output data is output as the data that is output by teacher model 110 for specific input data. The output data may be, for example, a value of log it and a probability value output from the corresponding model.

An input sequence X is input to the teacher model 110 and the student model 120. The input sequence X includes data including a plurality of elements $x_1, \ldots, x_M$ and includes, for example, sentence data including a plurality of words or speech data including a plurality of frames. Here, the sentence data is also referred to as text data including a plurality of words and the speech data is also referred to as data obtained by sampling the speech data for a length, for example, in units of frame. In an example, the length of the frames may be determined in advance.

In the example of FIG. 1, a probability distribution $p(Y=y_1 \ldots y_L|X; \theta_T)$ is output from the teacher model 110 and a probability distribution $q(Y=y_1 \ldots y_L|X; \theta_S)$ is output from the student model 120. Here, $\theta_T$ denotes parameters of the teacher model 110 and $\theta_S$ denotes parameters of the student model 120.

Also, Y is an output sequence output from each of the teacher model 110 and the student model 120, and includes a plurality of elements $y1, \ldots, y_L$.

The same output data as the teacher model 110 may be acquired at a high recognition rate through the student model 120 trained using the teacher model 110. Such training scheme is referred to as a model compression, and related description will be provided later.

The teacher model 110 and the student model 120 may be trained to perform a desired operation by mapping input data and output data that have a nonlinear relationship therebetween through deep learning to perform tasks such as, for example, object classification, object recognition, audio or speech recognition, and image recognition. The deep learning is a machine learning method used to solve a problem given from a big dataset. The deep learning may also be construed as a problem-solving process for optimization to find a point where energy is minimized while training the neural network using provided training data. Through the deep learning, for example, supervised or unsupervised learning, a weight corresponding to an architecture or a model of the neural network may be obtained, and the input data and the output data may be mapped to each other based on the obtained weight.

In an example, the teacher model 110 and the student model 120 may be implemented as an architecture having a plurality of layers including an input image, feature maps, and an output. In the teacher model 110 and the student model 120, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In another example, the teacher model 110 and the student model 120 may include an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network. Input data for the teacher model 110 and the student model 120 may include image data, voice data, and text data. However, they are provided as examples only, and other types of data are considered to be well within the scope of the present disclosure.

FIG. 2 illustrates an example of training a student model 120 using a teacher model 110.

The teacher model 110 and the student model 120 are networks in different sizes. A method and apparatus for recognizing data based on a neural network is suggested and a method and apparatus for training the neural network is suggested. In this specification, the term "recognition" is used as a concept including verification and identification. The verification is an operation of determining whether input data is true of false. For example, the verification may be an operation of determining whether input data is true or false. The identification is an operation of determining a label indicated by input data from among a plurality of labels. For example, the neural network is a model that receives a sequence and performs operations such as, for example, translation, interpretation, and speech recognition.

In an example, the student model 120 and the teacher model 110 may correspond to a recurrent neural network (RNN) or a convolutional neural network (CNN). In an example, the CNN may be a deep neural network (DNN). Ain an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. The plurality of layers may include an input layer, at least one hidden layer, and an output layer. In an example, neural network may include a sub-sampling layer, a pooling layer, a fully connected layer, etc., in addition to a convolution layer.

The neural network includes a plurality of layers, each including a plurality of nodes. Also, the neural network includes connection weights that connect the plurality of nodes included in the plurality of layers to a node included in another layer.

The neural network includes, for example, an input layer, at least one hidden layer, and an output layer. The input layer receives an input for performing training or recognition and transfers the input to the hidden layer. The output layer generates an output of the neural network based on a signal received from the hidden layer. The hidden layer is interposed between the input layer and the output layer, and changes data transferred though the input layer to a value to be easily predicted.

Input nodes included in the input layer and hidden nodes included in the hidden layer are connected through edges having connection weights. The hidden nodes included in the hidden layer and output nodes included in the output layer are connected through edges having connection weights.

The neural network may include a plurality of hidden layers. The neural network including the plurality of hidden layers is referred to as a deep neural network. Training of the deep neural network is referred to as deep learning. For example, the teacher model 110 greater in size than the student model 120 may include a greater number of hidden layers as compared to the student model 120.

A model training apparatus uses a gradient descent scheme based on output values of nodes included in a neural network and a loss that is back-propagated to the neural network, to determine parameters of the nodes. For example, the model training apparatus updates connection weights between the nodes through loss back-propagation learning. The loss back-propagation learning is a method of estimating a loss by performing forward computation on given training data, propagating the estimated loss in a reverse direction from the output layer toward the hidden layer and the input layer, and updating the connection weights to reduce the loss. A processing of the neural network is performed in a direction from the input layer toward the hidden layer and the output layer. In the loss back-propagation training, the update of the connection weights is performed in the direction from the output layer, toward the hidden layer and the input layer. One or more processors may use a buffer memory that stores a layer or a series of computation data to process the neural network in a desired direction.

In an example, the model training apparatus defines an objective function for measuring a degree to which currently set connection weights are close to optimum, continuously changes the connection weights based on a result of the objective function, and repetitively performs the training. The objective function is, for example, a loss function for calculating a loss between an actual output value output by the neural network based on the training input of the training data and a desired expected value to be output, for example, the training output. The model training apparatus updates the connection weights to reduce a value of the loss function. The loss function will be described in detail as follows.

The student model 120 is trained from the teacher model 110 based on knowledge distillation for knowledge propagation between two different neural networks. The knowledge distillation is a type of model compression. In this example, a Kullback-Leibler divergence (KLD) loss $\mathcal{L}_{KLD}$ is used, which is expressed by Equation 1 below.

$$\mathcal{L}_{KLD} = p(Y|X;\theta_T)\log\frac{p(Y|X;\theta_T)}{q(Y|X;\theta_S)} \quad \text{[Equation 1]}$$
$$= p(Y|X;\theta_T)\log p(Y|X;\theta_T)$$
$$- p(Y|X;\theta_T)\log q(Y|X;\theta_S)$$
$$= -H(p(Y|X;\theta_T)) + H(p(Y|X;\theta_T), q(Y|X;\theta_S))$$

In Equation 1, $H(p(Y|X; \theta_T), q(Y|X; \theta_S))$ denotes cross-entropy between the teacher model 110 and the student model 120. KLD-based knowledge distillation is a scheme for training the student model 120 using a probability distribution of the teacher model 110 as a soft-target.

The student model 120 is trained to output the recognition result of the teacher model 110 so that a difference between the recognition result of the teacher model 110 and the recognition result of the student model 120 is reduced. Here, the recognition result includes, for example, a probability distribution output from each model or a class sampled at a highest probability in the probability distribution.

Figure 3:
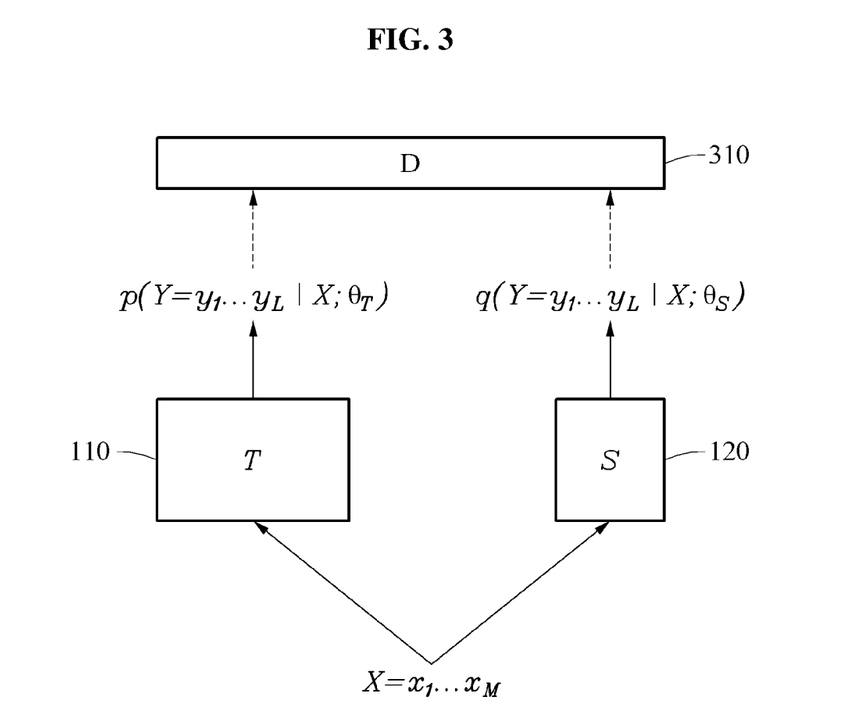
FIG. 3 illustrates an example of a process of training a student model.

FIG. 3 illustrates an example of a process of training a student model.

FIG. 3 illustrates an example of training a student model 120 using a discriminator model 310 and a teacher model 110.

The discriminator model 310 is a neural network that distinguishes between a recognition result of the teacher model 110 and a recognition result of the student model 120, and may include, for example, convolutional neural networks (CNN), recurrent neural networks (RNN), and self-attention. The discriminator model 310 is trained to distinguish the recognition result of the teacher model 110 as true and distinguish the recognition result of the student model 120 as false. The student model 120 is trained such that the recognition results of the teacher model 110 and the student model 120 are not distinguished from each other by the discriminator model 310. As such, a training in which two models are trained while competing against each other is referred to as an adversarial training. An adversarial loss $\mathcal{L}_{ADV}$ used in the training is expressed by Equation 2 below.

$$\mathcal{L}_{ADV} = \mathbb{E}_{y\sim p}[\log d((X, Y)|\theta_D)] + \quad \text{[Equation 2]}$$
$$\mathbb{E}_{y\sim q}[\log(1 - d((X, Y)|\theta_D))]$$
$$\cong \mathbb{E}_{y\sim p}[\log d(Y|\theta_D)] +$$
$$\mathbb{E}_{y\sim q}[\log(1 - d(Y|\theta_D))]$$

In Equation 2, $d(Y|\theta_D)$ denotes a probability distribution for distinguishing whether a sequence Y input to the discriminator model 310 is generated in the teacher model 110 or the student model 120. ~p indicates that the sequence Y input to the discriminator model 310 is input from the teacher model 110, ~q indicates that the sequence Y input to the discriminator model 310 is input from the student model 120, and $\mathbb{E}$ denotes an expectation.

The adversarial training is performed by training the student model 120 to reduce the adversarial loss $\mathcal{L}_{DV}$ and training the discriminator model 310 to increase the adversarial loss $\mathcal{L}_{ADV}$. Through this, the student model 120 is trained to output the same recognition result as the teacher model 110 at a degree such that the discriminator model 310 is unable to distinguish between the two.

Furthermore, the student model 120 is trained further based on the KLD loss $\mathcal{L}_{KLD}$ described above. According to Equation 3, the student model 120 is trained to reduce the KLD loss $\mathcal{L}_{KLD}$ and the adversarial loss $\mathcal{L}_{ADV}$. Also, the discriminator model 310 is trained to increase the adversarial loss $\mathcal{L}_{ADV}$. In an example, the teacher model 110 is fixed and not trained.

$$\min_S \max_D \mathcal{L}_{KLD} + \mathcal{L}_{ADV} \quad \text{[Equation 3]}$$

The discriminator model 310 receives a sequence or elements included in the sequence from each of the teacher model 110 and the student model 120, so that the training is performed in units or sequence or in units of element included in the sequence. A training process using the discriminator model 310 will be described in detail with reference to FIGS. 4 and 5.

Figure 4:
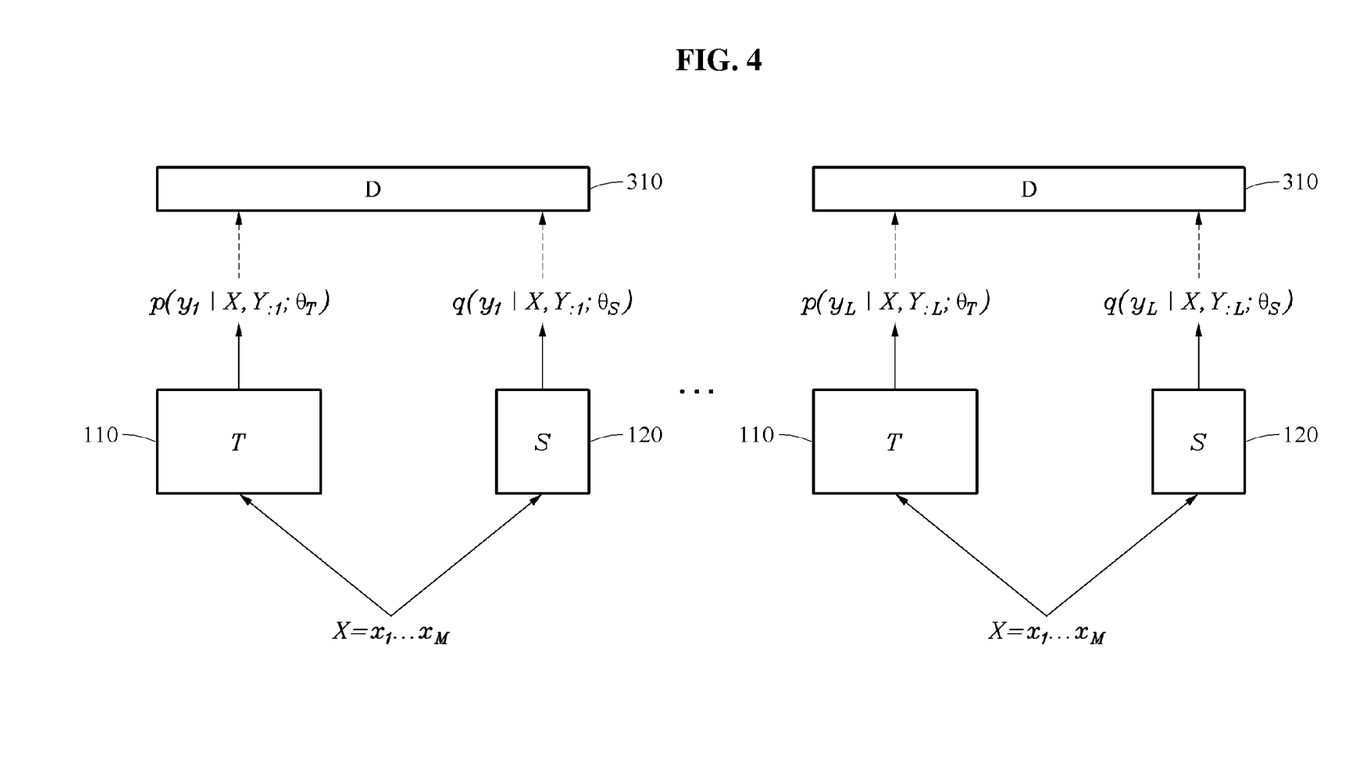
FIG. 4 illustrates an example of a process of performing a training in units of element.

FIG. 4 illustrates an example of a process of training performed in units of element.

Referring to FIG. 4, elements included in sequences output from a teacher model 110 and a student model 120 are input to a discriminator model 310 so that a training is performed in units of element.

A j-th element in the sequence output from the teacher model 110 and a j-th element in the sequence output from the student model 120 are transferred to the discriminator model 310. The discriminator model 310 distinguishes a model from which each of the j-th elements is input. In FIG. 4, $p(y_1|X, Y_{:1}; \theta_T)$ denotes a probability distribution corresponding to a first element in the sequence output from the teacher model 110, $q(y_1|X, Y_{:1}; \theta_S)$ denotes a probability distribution corresponding to a first element in the sequence output from the student model 120, $p(y_L|X, Y_{:L}; \theta_T)$ denotes a probability distribution corresponding to an L-th element in the sequence output from the teacher model 110, and $q(y_L|X, Y_{:L}; \theta_S)$ denotes a probability distribution corresponding to an L-th element in the sequence output from the student model 120.

In this example, an adversarial loss $\mathcal{L}_{ADV}$ is expressed by Equation 4 below.

$$\mathcal{L}_{ADV} \cong \frac{1}{L}\sum_{j=1}^{L}\left\{\begin{array}{l}G^p(y_j)\log d(z_j^p; \theta_D) + \\ G^q(y_j)\log(1 - d(z_j^q; \theta_D))\end{array}\right\} \quad \text{[Equation 4]}$$

In Equation 4, $z_j^p$ denotes a class of the j-th element in the sequence output from the teacher model 110 and $z_j^q$ denotes a class of the j-th element in the sequence output from the student model 120. $G^P(y_j)$ is a Gumbel-max that enables the student model 120 to be trained using the adversarial loss $\mathcal{L}_{ADV}$, which is expressed by Equation 5 below.

$$G^{\{p,q\}}(y_j) = \text{softmax}\left(\frac{\log\{p,q\}(y_j) + g}{\tau}\right), \quad \text{[Equation 5]}$$
$$g \sim -\log(-\log(\text{uniform}(0, 1)))$$

In Equation 5, as $\tau$ converges to 0, a greatest value of a probability distribution is close to 1 and remaining values is close to 0. Through the Gumbel-max, information on the discriminator model 310 is transferred to the student model 120 and used for the training of the student model 120.

The adversarial loss $\mathcal{L}_{ADV}$ decreases in a case in which classes $z_j^p$ and $z_j^q$ sampled in the probability distribution $p(y=y_1^p \ldots y_L^p|x; \theta_T)$ of the element output from the teacher model 110 and the probability distribution $q(y=y_z^q \ldots y_L^q|x; \theta_S)$ of the element output from the student model 120 are not distinguished from each other. Such case is expressed by Equation 6 below.

$$d(z_j^p; \theta_D) = d(z_j^q; \theta_D) = 0.5 \quad \text{[Equation 6]}$$

For the adversarial loss $\mathcal{L}_{ADV}$ of Equation 4, gradients for the student model 120 and the discriminator model 310 are expressed by Equation 7 from which it can be known that the training is performed normally.

$$\nabla_{\theta_S}\mathcal{L}_{ADV} \cong \frac{1}{L}\sum_{j=1}^{L}\log(1 - d(z_j^q | \theta_D))G^q(y_j)\nabla_{\theta_S}\log G^q(y_j) \quad \text{[Equation 7]}$$

$$\nabla_{\theta_D}\mathcal{L}_{ADV} \cong$$

-continued
$$\frac{1}{L}\sum_{j=1}^{L}G^q(y_j)\nabla_{\theta_D}\log d(z_j^q; \theta_D) + G^p(y_j)\nabla_{\theta_D}\log(1 - d(z_j^p; \theta_D))$$

Figure 5:
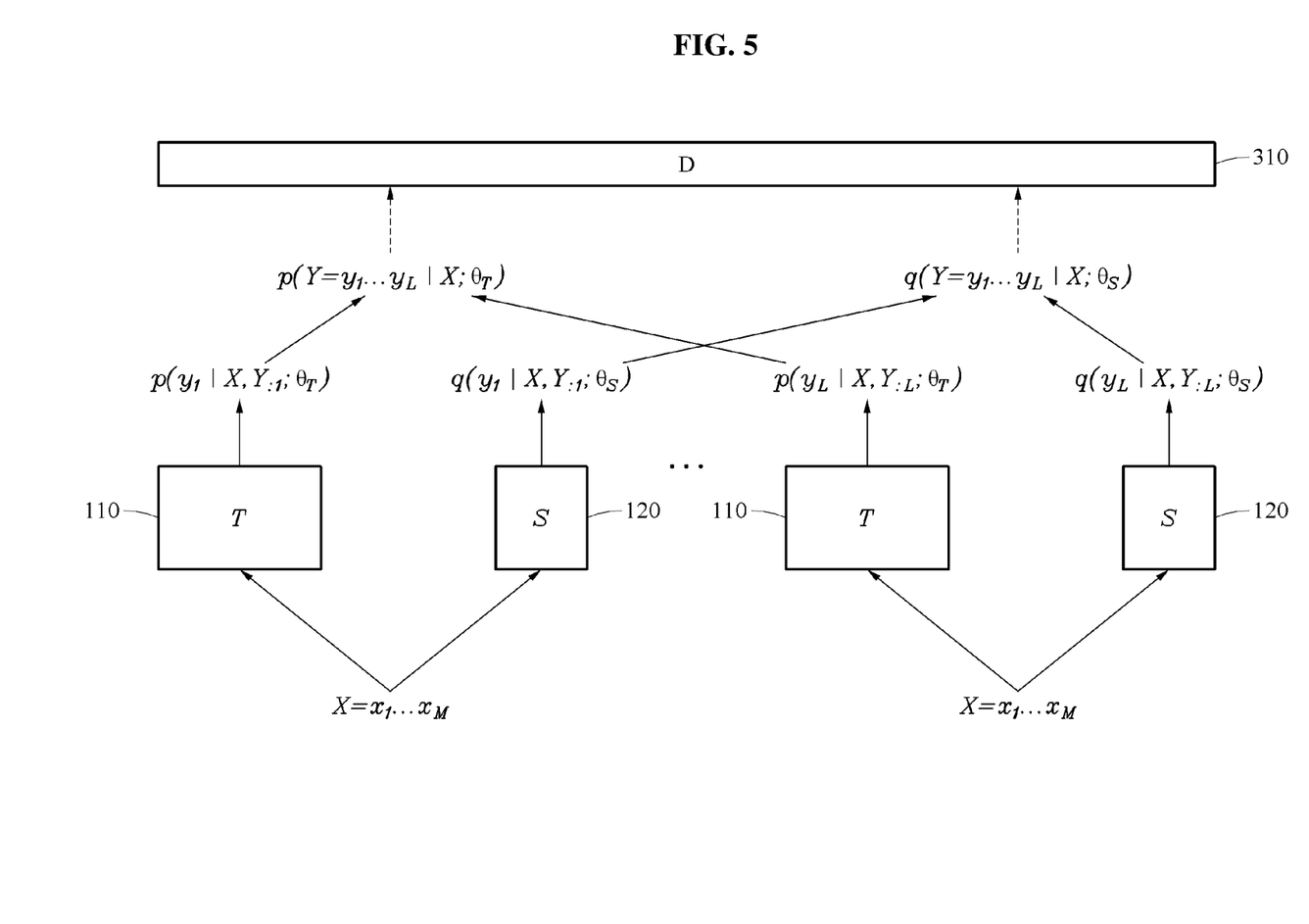
FIG. 5 illustrates an example of a process of performing a training in units of sequence.

FIG. 4 illustrates an example of a process of training performed in units of sequence.

Referring to FIG. 5, sequences output from a teacher model 110 and a student model 120 are input to a discriminator model 310 so that a training is performed in units of sequence.

The sequence output from the teacher model 110 and the sequence output from the student model 120 are transferred to the discriminator model 310. The discriminator model 310 distinguishes a model from which each of the sequences is input. In FIG. 5, $p(Y=y_1 \ldots y_L|XC; \theta_T)$ denotes a probability distribution corresponding to the sequence output from the teacher model 110 and $q(Y=y_1 \ldots y_L|X; \theta_S)$ denotes a probability distribution corresponding to the sequence output from the student model 120.

In this example, an adversarial loss $\mathcal{L}_{ADV}$ is expressed by Equation 8 below.

$$\mathcal{L}_{ADV} \cong G^p(Y)\log d(Z^p; \theta_D) + G^q(Y)\log(1-d(Z^q; \theta_D)) \quad \text{[Equation 8]}$$

A Gumbel-max applied to Equation 8 is determined based on a combination of probabilities of elements, or determined based on a probability of a sequence.

A Gumbel-max based on a combination of probabilities of elements is as shown in Equation 9.

$$G^{\{p,q\}}(Y) \cong \text{softmax}((\Sigma_{j=1}^{L}\log\{p,q\}(y_j)+g)/\tau) \quad \text{[Equation 9]}$$

As such, the Gumbel-max is determined based on a multiplication of probabilities of elements included in an output sequence.

A Gumbel-max based on a probability of a sequence is as shown in Equation 10.

$$G^{\{p,q\}}(Y) \cong \frac{\exp\left(\frac{\log\{p,q\}(Y) + g}{\tau}\right)}{\sum_{Y'}\exp\left(\frac{\log\{p,q\}(Y') + g}{\tau}\right)} \quad \text{[Equation 10]}$$

In Equation 10, Y' denotes a number of candidate sequences that may correspond to an output sequence, and may be, for example, k-best among the candidate sequences. As such, by limiting the number of candidate sequences, the Gumbel-max is determined based on a probability of the output sequence.

$Z^{\{p,q\}}$ applied to the adversarial loss $\mathcal{L}_{ADV}$ denotes a class of a sequence sampled based on the probability distribution output from the teacher model 110 or the student model 120. For example, $Z^{\{p,q\}}$ denotes a class of a sequence selected as one-best using various schemes such as, for example, beam search and gradient search. One of the schemes for determining $Z^{\{p,q\}}$ is expressed by Equation 11 below.

$$Z^{\{p,q\}} = z_1^{\{p,q\}} \ldots z_L^{\{p,q\}} \quad \text{[Equation 11]}$$
$$z_L^{\{p,q\}} = \begin{cases} \text{onehot}(\text{argmax } y_j^{\{p,q\}}) & U(0,1) \leq \omega \\ y_j^* & \text{otherwise} \end{cases}$$

In Equation 11, $y^*_j$ denotes a j-th element in a ground truth sequence, U(0,1) denotes a uniform distribution, and $\omega$ denotes a threshold.

For the adversarial loss $\mathcal{L}_{ADV}$ of Equation 8, gradients for the student model 120 and the discriminator model 310 are expressed by Equation 12 from which it can be known that the training is performed normally.

$$\nabla_{\theta_S} \mathcal{L}_{ADV} \cong \log(1-d(z^q|\theta_D))G^q(y)\nabla_{\theta_S} \log G^q(y)$$

$$\nabla_{\theta_D} \mathcal{L}_{ADV} \cong G^q(y)\nabla_{\theta_D} \log d(z^p|\theta_D) + G^p(y)\nabla_{\theta_D} \log(1-d(z^q|\theta_D))$$

[Equation 12]

Figure 6:
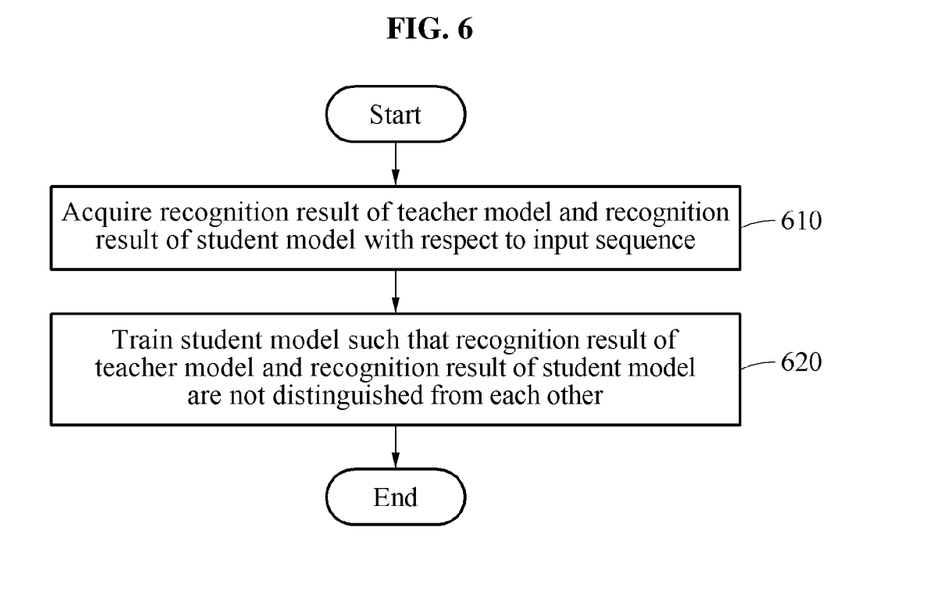
FIG. 6 illustrates an example of a model training method.

FIG. 6 illustrates an example of a model training method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-5 are also applicable to FIG. 6 and are incorporated herein by reference. Thus, the above description may not be repeated here.

The model training method is performed by a processor of a model training apparatus.

In operation 610, the model training apparatus acquires a recognition result of a teacher model and a recognition result of a student model with respect to an input sequence.

In operation 620, the model training apparatus trains the student model such that the recognition result of the teacher model and the recognition result of the student model are not distinguished from each other, in other words, the recognition result of the teacher model and the recognition result of the student model converge as a result of the training. The model training apparatus determines an adversarial loss based on a degree to which the recognition result of the teacher model and the recognition result of the student model are distinguished from each other, and trains the student model such that the adversarial loss is reduced.

In one example, the model training apparatus determines an adversarial loss based on a degree to which an output sequence of the teacher model and an output sequence of the student model that are respectively output as recognition results for the input sequence are distinguished from each other. For example, the model training apparatus determines the adversarial loss by applying a Gumbel-max based on probabilities of elements included in an output sequence. Also, the model training apparatus determines the adversarial loss by applying a Gumbel-max based on a probability of an output sequence.

In another example, the model training apparatus determines an adversarial loss based on a degree to which an element included in an output sequence of the teacher model and an element included in an output sequence of the student model that are respectively output as recognition results for the input sequence are distinguished from each other. For example, the model training apparatus determines the adversarial loss by applying a Gumbel-max based on a probability of an element included in an output sequence.

The model training apparatus trains the student model such that the recognition result of the teacher model and the recognition result of the student model are not distinguished from each other by a discriminator model. In this example, the discriminator model is trained to distinguish between the recognition result of the teacher model and the recognition result of the student model.

The model training apparatus trains the student model using the recognition result of the teacher model such that the recognition result of the teacher model is output from the student model.

Figure 7:
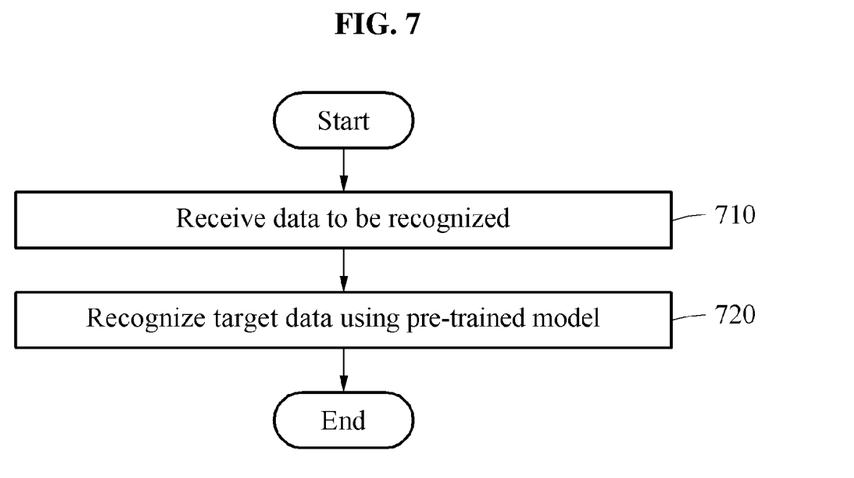
FIG. 7 illustrates an example of a data recognition method.

FIG. 7 illustrates an example of a data recognition method.

The data recognition method is performed by a processor of a data recognition apparatus.

In operation 710, the data recognition apparatus receives data to be recognized. In operation 720, the data recognition apparatus recognizes target data using a pre-trained model. In an example, the pre-trained model is the student model described above. Since a training method of the student model is the same as that described above, the descriptions of FIGS. 1-6 are also applicable to FIG. 7 and are incorporated herein by reference. Thus, the above description may not be repeated here and is omitted for brevity.

Figure 8:
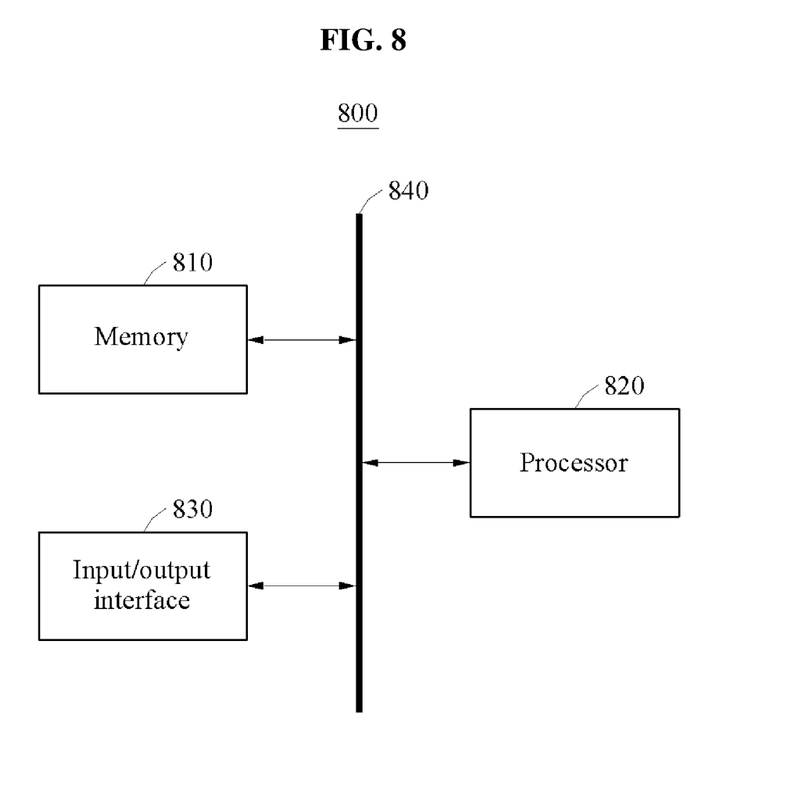
FIG. 8 illustrates an example of an apparatus for processing data based on a neural network.

FIG. 8 illustrates an example of an apparatus for processing data based on a neural network.

Referring to FIG. 8, a data processing apparatus 800 includes a memory 810, a processor 820, and an input/output interface 830. The memory 810 and the processor 820 communicate with each other via a bus 840.

The data processing apparatus 800 is an apparatus for processing input data and outputting the processed data, and may be one of the model training apparatus and the data recognition apparatus described herein.

The memory 810 includes instructions to be read by a computer. The processor 820 performs the aforementioned operations in response to the instructions stored in the memory 810 being executed in the processor 820. The processor 820 may be a data processing device configured as hardware having a circuit in a physical structure to implement desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. Further details regarding the processor 820 is provided below.

The memory 810 is a volatile memory or a non-volatile memory. In addition, the data processing apparatus 800 processes the operations described herein. Further details regarding the memory 810 is provided below.

In an example, the input/output interface 830 may be a display that receives an input from a user or provides an output. In an example, the input/output interface 830 may function as an input device and receives an input from a user through a traditional input method, for example, a keyboard and a mouse, and a new input method, for example, a touch input, a voice input, and an image input. Thus, the input/output interface 830 may include, for example, a keyboard, a mouse, a touchscreen, a microphone, and other devices that may detect an input from a user and transmit the detected input to the data processing apparatus 800.

In an example, the input/output interface 830 may function as an output device, and provide an output of the data processing apparatus 800 to a user through a visual, auditory, or tactile channel. The input/output interface 830 may include, for example, a display, a touchscreen, a speaker, a vibration generator, and other devices that may provide an output to a user.

However, the input/output interface 830 are not limited to the example described above, and any other displays, such as, for example, computer monitor and eye glass display (EGD) that are operatively connected to the data processing apparatus 800 may be used without departing from the spirit and scope of the illustrative examples described. In an example, the input/output interface 830 is a physical structure that includes one or more hardware components that provide the ability to render a user interface, render a display, and/or receive user input.

The data processing apparatus 800 may be implemented in various electronic devices, such as, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a head-up display (HUD), a handheld game console, an e-book, a television (TV), a high definition television (HDTV), a smart TV, a smart appliance, a smart home device, or a security device for gate control, various Internet of Things (IoT) devices, an autonomous vehicle, an automatic or autonomous driving system, an intelligent vehicle, an advanced driver assistance system (ADAS), or any other device capable of wireless communication or network communication consistent with that disclosed herein. In an example, the data processing apparatus 800 recognizes target data using a pre-trained model. In an example, the pre-trained model is the student model described above.

In an example, the data processing apparatus 800 may be connected to an external device, such as, for example, a personal computer (PC) or a network, via an input/output device of the external device, to exchange data with the external device.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of training a model based on a neural network or a method of training a model. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training a model, the method comprising:
acquiring a recognition result of a teacher model and a recognition result of a student model for an input sequence;
determining an adversarial loss based on a degree to which an output sequence of the teacher model and an output sequence of the student model that are respectively output as recognition results for the input sequence are distinguished from each other; and
training the student model to reduce the adversarial loss, wherein the determining of the adversarial loss comprises determining the adversarial loss by applying a Gumbel-max based on a probability of the output sequence of the teacher model.

2. The method of claim 1, wherein the determining of the adversarial loss comprises:
determining the adversarial loss by applying the Gumbel-max based on probabilities of elements included in an output sequence.

3. The method of claim 1, wherein the determining of the adversarial loss comprises:
determining the adversarial loss by further applying the Gumbel-max based on probabilities of a number of candidate sequences that are likely to correspond to the output sequence.

4. The method of claim 1, wherein the determining of the adversarial loss comprises:
determining the adversarial loss based on a degree to which an element in an output sequence of the teacher model and an element in an output sequence of the student model that are respectively output as recognition results for the input sequence are distinguished from each other.

5. The method of claim 4, wherein the determining of the adversarial loss comprises:
determining the adversarial loss by applying the Gumbel-max based on a probability of an element included in an output sequence.

6. The method of claim 1, wherein the training of the student model comprises:
training the student model such that the recognition result of the teacher model and the recognition result of the student model are not distinguished from each other by a discriminator model, and
the discriminator model is trained to distinguish between the recognition result of the teacher model and the recognition result of the student model.

7. The method of claim 1, wherein the training of the student model comprises:
training the student model using the recognition result of the teacher model such that the recognition result of the teacher model is output from the student model.

8. The method of claim 1, wherein the input sequence includes sentence data comprising words and speech data comprising frames.

9. A non-transitory computer-readable storage medium storing instructions that, when executed by a processor, cause the processor to perform the method of claim 1.

10. An apparatus for training a model, the apparatus comprising:
a processor configured to
acquire a recognition result of a teacher model and a recognition result of a student model for an input sequence;
determine an adversarial loss based on a degree to which an output sequence of the teacher model and an output sequence of the student model that are respectively output as recognition results for the input sequence are distinguished from each other; and
train the student model to reduce the adversarial loss, wherein the adversarial loss is based on applying a Gumbel-max based on a probability of the output sequence of the teacher model.

11. The apparatus of claim 10, wherein the processor is further configured to determine the adversarial loss by applying the Gumbel-max based on probabilities of elements included in an output sequence.

12. The apparatus of claim 10, wherein the processor is further configured to determine the adversarial loss based on a degree to which an element in an output sequence of the teacher model and an element in an output sequence of the student model that are respectively output as recognition results for the input sequence are distinguished from each other.

13. The apparatus of claim 10, wherein the processor is further configured to train the student model such that the recognition result of the teacher model and the recognition result of the student model are not distinguished from each other by a discriminator model, and the discriminator model is trained to distinguish between the recognition result of the teacher model and the recognition result of the student model.

14. The apparatus of claim 10, wherein the processor is further configured to train the student model using the recognition result of the teacher model such that the recognition result of the teacher model is output from the student model.

15. The apparatus of claim 10, further comprising a memory configured to store a parameter of the student model, and to store instructions that, when executed, configures the processor to acquire the recognition result of the teacher model and the student model, and to train the student model.

16. An apparatus for training a model, the apparatus comprising;
   a processor configured to
      acquire a recognition result of a teacher model and a recognition result of a student model for an input sequence, and
      determine an adversarial loss based on a degree to which an output sequence of the teacher model and an output sequence of the student model that are respectively output as recognition results for the input sequence are distinguished from each other;
      train the student model to minimize the adversarial loss, at a discriminator model,
   wherein the adversarial loss is based on applying a Gumbel-max based on a probability of the output sequence of the teacher model.

* * * * *